(12) United States Patent
Adams

(10) Patent No.: US 6,430,891 B1
(45) Date of Patent: Aug. 13, 2002

(54) CONSTRUCTION ELEMENT AND COUPLING DEVICE THEREOF

(75) Inventor: William E. Adams, Harmony, PA (US)

(73) Assignee: Adams Mfg. Corp., Portersville, PA (US)

(*) Notice: Subject to any disclaimer, the term of this patent is extended or adjusted under 35 U.S.C. 154(b) by 0 days.

(21) Appl. No.: 09/672,355

(22) Filed: Sep. 28, 2000

(51) Int. Cl.[7] .................................................. E04C 3/30
(52) U.S. Cl. ..................... 52/726.1; 52/656.9; 403/173; 403/359.1
(58) Field of Search .............................. 52/726.1–726.3, 52/655.1, 656.9; 403/359.1, 170, 173, 354

(56) References Cited

U.S. PATENT DOCUMENTS

| 9,552 A | 1/1853 | Bell |
|---|---|---|
| 2,097,172 A | 10/1937 | Yurkovitch |
| 2,823,404 A | 2/1958 | Hyman |
| 2,848,769 A | 8/1958 | Oakley |
| 3,628,300 A | 12/1971 | Tsurumi |
| 4,809,401 A | 3/1989 | Honig |
| 5,464,305 A | 11/1995 | Liem |
| 5,704,186 A | 1/1998 | Alcalay et al. |
| 5,788,400 A | 8/1998 | Wey |
| 6,065,899 A | 5/2000 | Adams et al. |

*Primary Examiner*—Yvonne M. Horton
(74) *Attorney, Agent, or Firm*—Webb Ziesenheim Logsdon Orkin & Hanson, P.C.

(57) ABSTRACT

A construction element has at least one coupling device and the coupling device has at least two prongs. Each prong is comprised of two radially extending mating surfaces which frictionally engage the radially extending surfaces of a mating coupling device. The construction device may have a straight shaft or an angled shaft to accommodate the needs of the user and, furthermore, the prongs of a coupling device may be inserted within mateable apertures in the shaft of another construction element. Using a plurality of such construction elements, a lattice frame may be constructed.

12 Claims, 6 Drawing Sheets

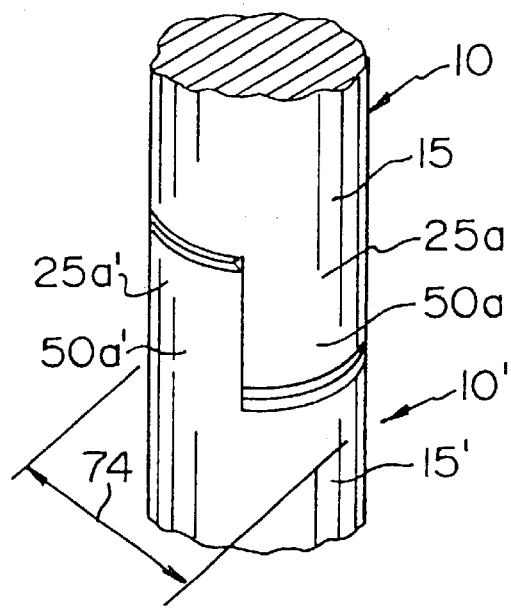
FIG. 4
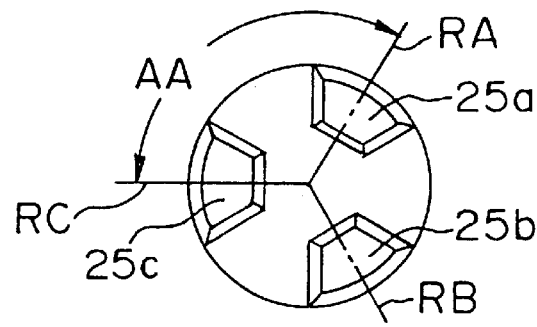
FIG. 5
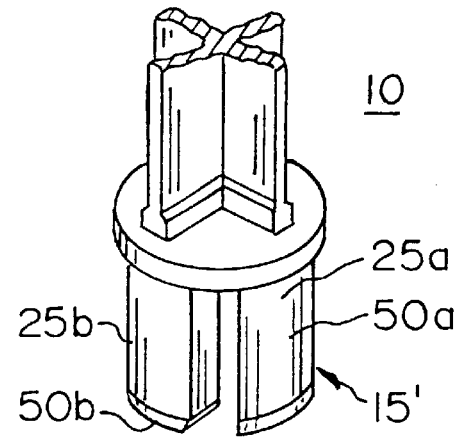
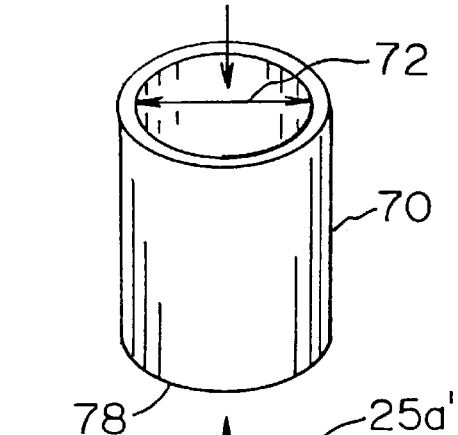
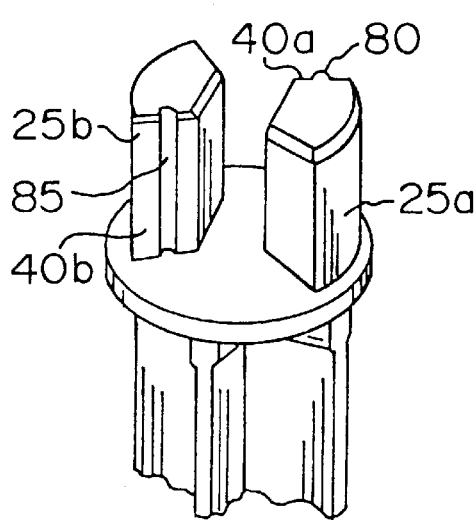
FIG. 7
FIG. 6

CONSTRUCTION ELEMENT AND COUPLING DEVICE THEREOF

BACKGROUND OF THE INVENTION

1. Field of the Invention

The present invention relates to construction elements and, more particularly, to a construction element with a coupling device for use in a lattice structure.

2. Description of the Related Art

Construction elements may be comprised of connector elements and structural elements. These elements may be combined in various configurations to form composite structures.

U.S. Pat. No. 5,704,186 describes a construction element having opposing jaws which expand and lock upon protrusions extending from an adjacent construction element. While this positive-lock feature may be desirable in certain circumstances, fabrication of such an element is complex.

It is an object of the present invention to provide a construction element intended for a lattice structure in which the construction element utilizes a coupling device that is relatively simple and provides a secure attachment when mated with another coupling device.

Other objects of the present invention will become apparent to those of ordinary skill in the art upon reading and understanding the following detailed description.

SUMMARY OF THE INVENTION

In one embodiment of the subject invention, a coupling device is comprised of a base with a coupling axis and at least two spaced-apart prongs which extend from the base and are parallel to the coupling axis. Each prong is comprised of: (a) two radially extending mating surfaces, each having a first and second end; (b) an inner transition surface connecting the first ends of each mating surface; (c) an outer transition surface connecting the second ends of each mating surface; and (d) wherein each mating surface forms an equal but opposite angle with a common baseline connecting the second end of each mating surface.

In another embodiment of the subject invention, a construction element has a core and at least one coupling device integrally thereto, wherein each coupling device is comprised of a base with a coupling axis and at least two spaced-apart prongs which extend from the base and are parallel to the coupling axis, wherein each prong is comprised of. (a) two radially extending mating surfaces, each having a first and second end; (b) an inner transition surface connecting the first ends of each mating surface; (c) an outer transition surface connecting the second ends of each mating surface; and (d) wherein each mating surface forms an equal but opposite angle with a common baseline connecting the second end of each mating surface.

In yet another embodiment of the subject invention, a construction element system is comprised of a plurality of interconnected construction elements secured to one another by coupling devices, wherein each construction element has a core and wherein each coupling device is comprised of a base with a coupling axis and at least two spaced-apart prongs which extend from the base and are parallel to the coupling axis, wherein each prong is comprised of: (a) two radially extending mating surfaces, each having a first and second end; (b) an inner transition surface connecting the first ends of each mating surface; (c) an outer transition surface connecting the second ends of each mating surface; and (d) wherein each mating surface forms an equal but opposite angle with a common baseline connecting the second end of each mating surface.

BRIEF DESCRIPTION OF THE DRAWINGS

FIGS. 3 and 4 are perspective views illustrating the manner in which two construction elements are coupled to one another;

FIG. 5 is an end view of one construction element illustrating the use of three prongs;

FIG. 6 is a perspective view illustrating the manner in which a ring may be utilized to better secure two construction elements;

FIG. 7 is a perspective view of a construction element in which a tongue and groove are introduced to the prongs to introduce lateral stiffness;

DETAILED DESCRIPTION OF THE INVENTION

Figure 1:
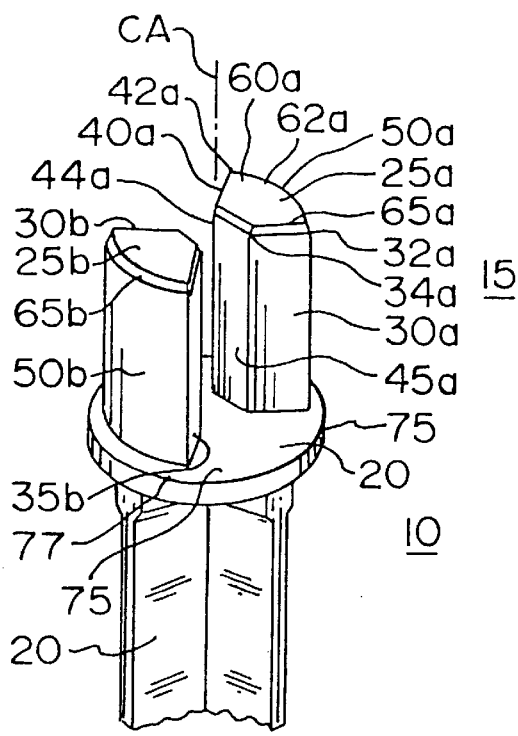
FIG. 1 is a perspective view of a construction element and coupling device in accordance with the subject invention.
Figure 2:
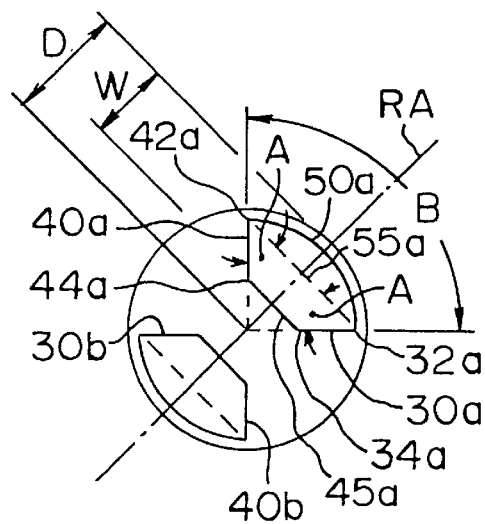
FIG. 2 is a top view of the construction element illustrated in FIG. 1.

FIG. 1 illustrates a portion of a construction element 10 having a coupling device 15. FIG. 2 illustrates a top view of the coupling device 15. The couple device is comprised of a base 20 with a coupling axis CA and at least two spaced-apart prongs 25a, 25b which extend from the base 20 and are parallel to the coupling axis CA.

Prongs 25a, 25b are identical to one another with the exception that they are located about the coupling axis CA at radially opposing positions. For that reason and with this exception, the discussion will be directed to prong 25a with the understanding that each feature discussed in 25a is also present in 25b.

Prong 25a has two radially extending mating surfaces 30a and 40a. Mating surface 30a has a first end 32a and a second end 34a, while mating surface 40a has a first end 42a and a second end 44a. An inner transition surface 45a connects the second ends 34a, 44a of each mating surface 30a, 40a. An outer transition surface 50a connects the first ends 32a, 42a of each mating surface 30a, 40a. Additionally, each mating surface 30a, 40a forms an equal but opposite angle A (FIG. 2) with a common baseline 55a extending from first ends 32a, 42a of each mating surface 30a, 40a.

Each prong 25a, 25b, as shown by representative prong 25a, is centered about a radial line RA and the radial lines associated with each prong are equiangular relative to one another about the coupling axis CA. The mating surfaces 30a, 40a may be planar and, when viewed in plan, intersect with the coupling axis CA to form an angle B not greater than 90°.

The width W of prong 25a is defined by the length of the radial line RA associated with each prong 25a from the inner transition surface 45a to the outer transition surface 50a. The width W is less than two-thirds the distance D from the coupling axis CA to the outer transition surface 50a along the radial line RA.

Each prong 25a has a top surface 60a with an edge 62a that may have a chamfered portion 65a. This chamfered portion 65a increases the ease with which two coupling devices may be mated. For simplicity, this chamfered portion 65a is not shown in FIG. 2.

Figure 3:
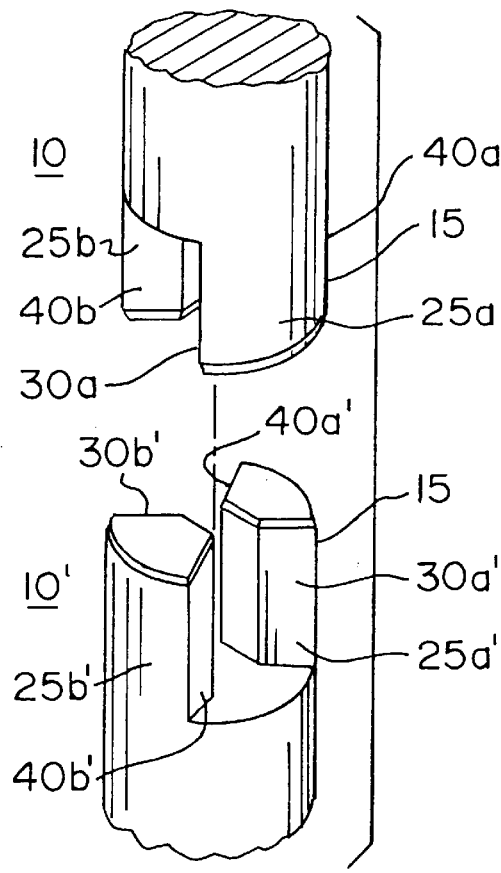

As illustrated in FIG. 3, coupling devices 15 on construction element 10 and construction element 10' are compatible with one another such that the prongs 25a, 25b and 25a', 25b' interlock with one another and the related mating surfaces 30a, 40b', 40b, 30b', 30b, 40a', and 40a, 30a' engage to create a frictional coupling.

FIG. 4 illustrates the construction elements 15, 15' of FIG. 3 in the assembled position.

It should be apparent that this discussion may be equally applied to a coupling device having more than two prongs, such as the coupling device illustrated in FIG. 5 having three prongs 25a, 25b, 25c. Although not illustrated, even more prongs are possible. It should be appreciated, however, that the radial lines RA, RB, RC extending through the center of each of these prongs 25a, 25b, 25c form equal angles with each other about the coupling axis CA and such a feature is preferred regardless of the number of prongs in the coupling device. As an example, angle AA between each pair of adjacent radial lines RA, RB, RC will be 60°.

Briefly returning to FIG. 4, the outer transition surface 50a of prong 25a and the outer transition surface 50a' of prong 25a' may be curved such that when two construction elements 10, 10' are mated, their coupling elements 15, 15' form a cylinder.

With this concept in mind and directing attention to FIG. 6, a ring 70 having an inner diameter 72 approximately equal to an outer diameter 74 (FIG. 4) of construction elements 10, 10' may be utilized to provide an envelope about the mating coupling devices of two construction elements 10, 10'. The ring 70 is positioned around the outer transition surfaces 50a, 50a' to restrain deflection of the prongs 25a, 25a' when two coupling devices 15, 15' are mated.

A lip 75 may protrude radially from the base 20 beyond the outer transition surface 50 to define a shoulder 77 to locate and support an end surface 78 of ring 70 when it is positioned around the outer transition surfaces 50a, 50a', 50b, 50b'.

As previously mentioned, the prongs 25a are sized to provide an interference fit along their mating surfaces 30a, 40a when engaged with other coupling devices. Each prong may be made of a resilient material such as, for example, polyurethane. As another alternative to minimize deflection of the prongs when one coupling device is connected to another coupling device, as illustrated in FIG. 7, one prong 25a may have a tongue 80 protruding from one mating surface 40a and a groove 85 recessed within another mating surface 40b and complementary in shape to tongue 80, whereby the tongue and groove of one coupling device engage the groove and tongue, respectively, of another coupling device.

The discussion so far has been focused upon a coupling device 15 which may be used with a construction element 10. In addition to this coupling device 15, the subject invention is also directed to the details of the construction element 10.

Figure 8:
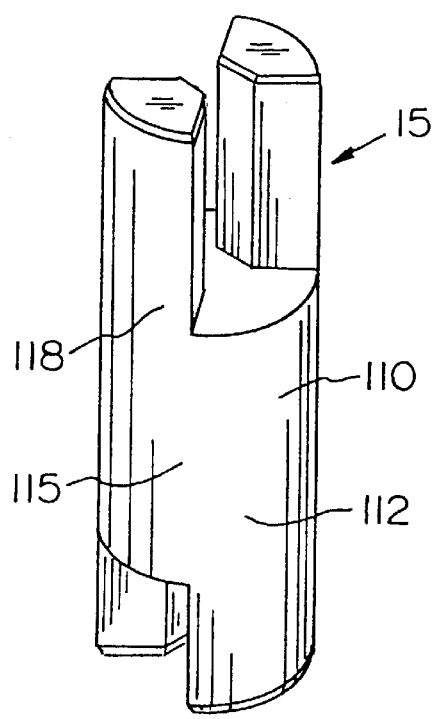
FIG. 8 is a perspective view of a construction element having a coupling device at each end.

Directing attention to FIG. 8, a construction element 110 may have a core 112 and at least one coupling device 15 attached integrally thereto. The details of the coupling devices are similar to those coupling devices previously described. The core 112 may be a shaft 115, wherein the coupling device 15 is attached to at least one end 118 of the shaft 115. Furthermore, as illustrated in FIG. 8, the shaft 115 may be straight.

Figure 9:
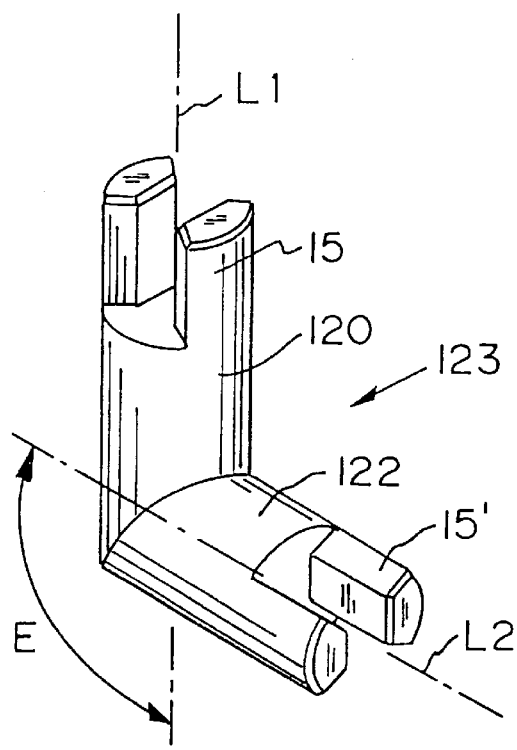
FIG. 9 is a construction element having an angled shaft.

FIG. 9 illustrates a similar arrangement with a construction element 123 utilizing coupling devices 15, 15'. However, in this instance, the shaft is comprised of two parts 120, 122, each having a centerline L1, L2 which intersect to form an angle E of any suitable value.

Figure 10:
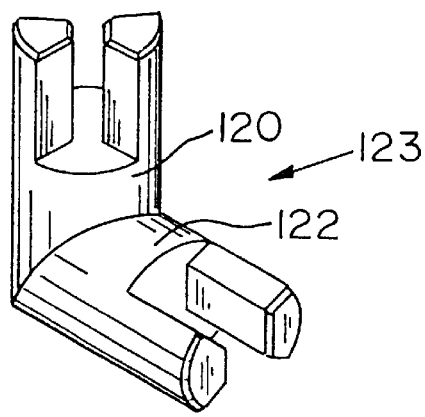
FIG. 10 is a perspective view of a construction element similar to that in FIG. 8 but shorter, thereby providing an element that may connect and redirect other construction elements.

FIG. 10 illustrates a configuration similar to that of FIG. 9, however, the parts 120, 122 have a much shorter length such that the construction element 124 acts primarily as a joint to connect other construction elements.

Figure 11:
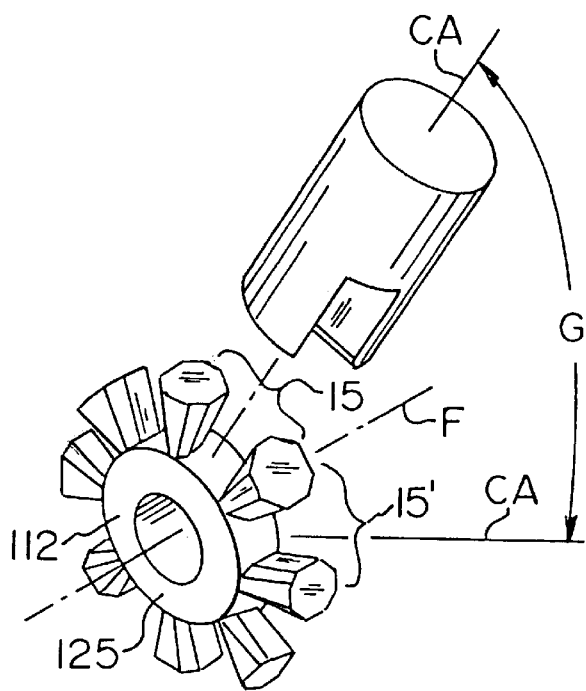
FIG. 11 is a perspective view of a construction element in which a plurality of coupling devices is mounted radially about a hub.

In another embodiment, the core 112, as illustrated in FIG. 11, may be a segment 125 having a central axis F and wherein at least two coupling devices 15, 15' are oriented such that their coupling axes CA extend from the central axis F at different radial angles. In one embodiment, the coupling devices 15, 15' are angled apart from one another with an angle G of at least 30°. Construction element 110 is shown in position to couple with coupling device 15.

The discussion so far has been directed to coupling devices 15 which are mateable with other coupling devices whether such coupling devices are included at the end of one shaft, as illustrated in FIG. 8, or oriented at different radial angles about a segment, as illustrated in FIG. 11. However, it is also possible to utilize the shaft itself of a construction element for accepting coupling devices or for mounting other configurations.

Figure 12:
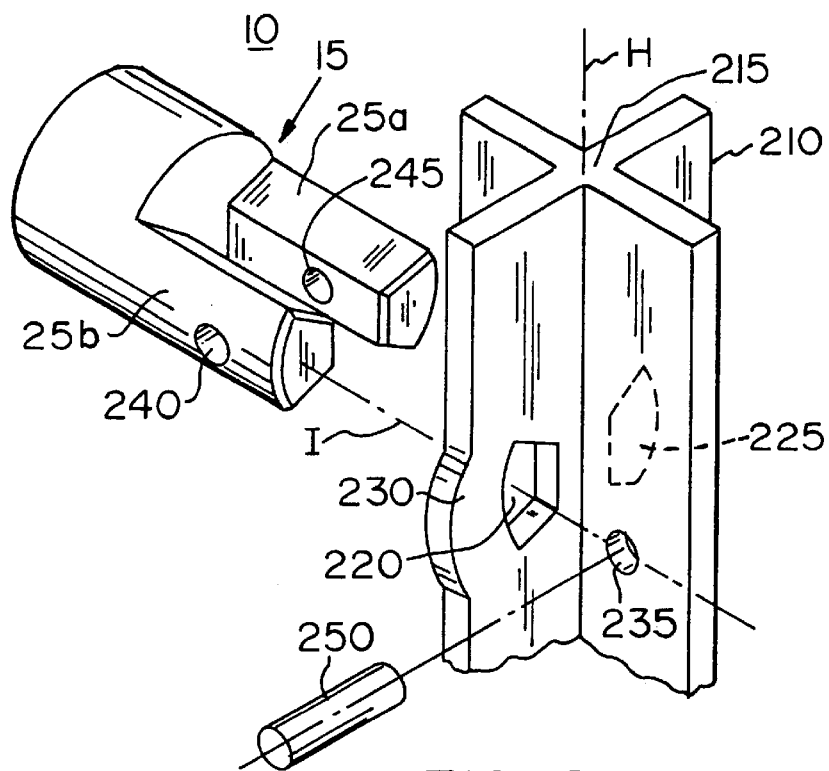
FIG. 12 is a perspective view illustrating the manner in which a construction element may be mounted within the shaft of another construction element.

Directing attention to FIG. 12, a construction element 210 has a shaft 215 which extends along an axis H and has apertures 220, 225 generally along or parallel to an axis I, transverse to the shaft axis H. Each aperture 220, 225 is complementary in shape to the prongs 25a, 25b of a coupling device 15 associated with a construction element 10 such that the prongs 25a, 25b of the construction element 10 may be secured directly within the apertures 220, 225. Since any material removed from the shaft 210 may structurally weaken the shaft 210, an area 230 of material proximate to the apertures 220, 225 may be enlarged to compensate for material removed for the apertures 220, 225.

As a mechanism for further securing the construction element 10 to the shaft 210, the shaft may have a locking hole 235 which aligns with matching locking holes 240, 245 extending through the prongs 25a, 25b and transverse to the apertures 220, 225, such that the locking holes 240, 245 may be aligned with locking hole 235 and a locking pin 250 may be inserted therein.

Figure 13:
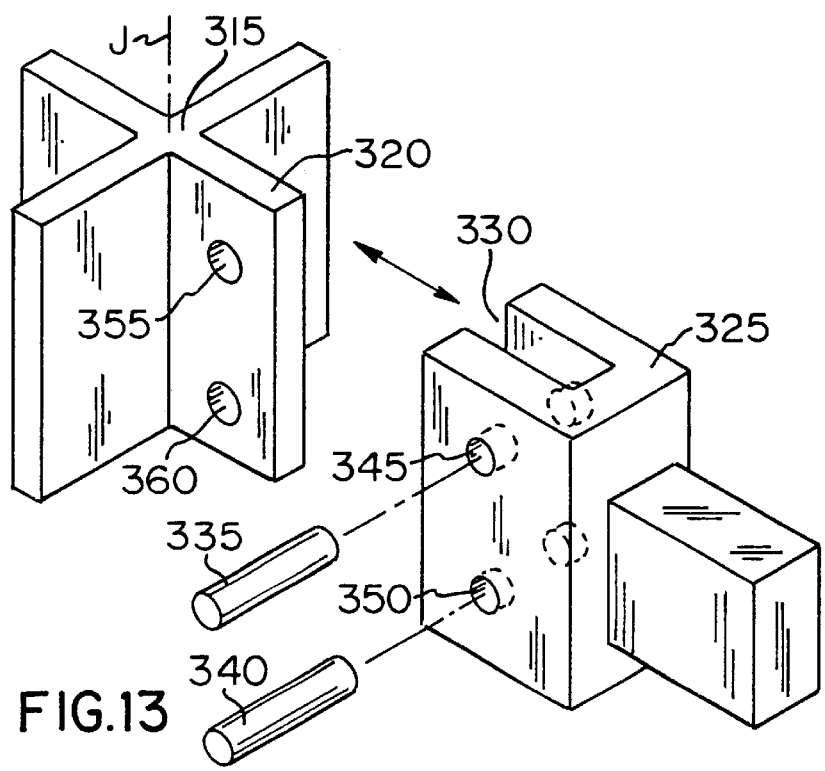
FIG. 13 is a perspective view showing an attachment connected to the fin of a construction element.

Additionally, with attention directed to FIG. 13, a shaft 315 may have at least one fin 320 extending at least partially along the axis J of the shaft 315. An attachment 325 having a longitudinal slot 330 may be fitted over the fin 320 and secured thereto. In particular, at least one locking pin 335 and, optionally, a second locking pin 340 may extend into apertures 345, 350, which are coaxial with mating apertures 355, 360 within the fin 320, thereby securing the attachment 325 to the fin 320.

Figure 14:
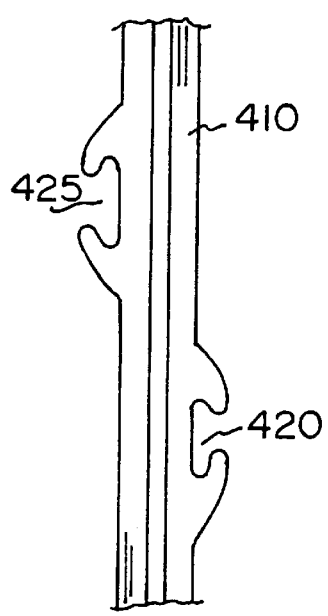
FIG. 14 is a side view of a shaft of one construction element.

As found in FIG. 14, which illustrates a portion of a shaft 410, similar to shaft 215 or shaft 315, the shaft 410 may have a plurality of shapes 420, 425 along its length for securing miscellaneous items thereto.

Figure 15:
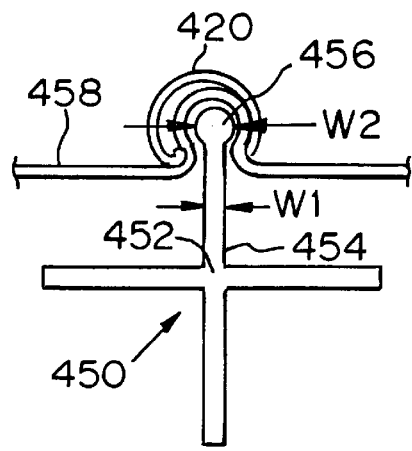
FIG. 15 is a side view of a shaft of anther construction element.

While FIG. 14 illustrates the manner in which items may be hung from the shaft 410 of a construction element, it is also possible to secure items to the shaft. FIG. 15 illustrates a portion of a construction element 450 having a shaft 452 with a fin 454 wherein the fin 454 has a width WI. The fin 454 has an enlarged end 456 with a width W2. A pliable sheet-like member 458, such as cloth, may be placed over the enlarged end 456 and secured thereto using a clamp 460 to urge the sheet-like member 458 against the enlarged end 456. The clamp 460 may be resilient such it may be expanded to resiliently urge the member 458 against the end 456 or the clamp 460 may be mechanically operated to pinch the member 458 against the end 456.

Figure 16:
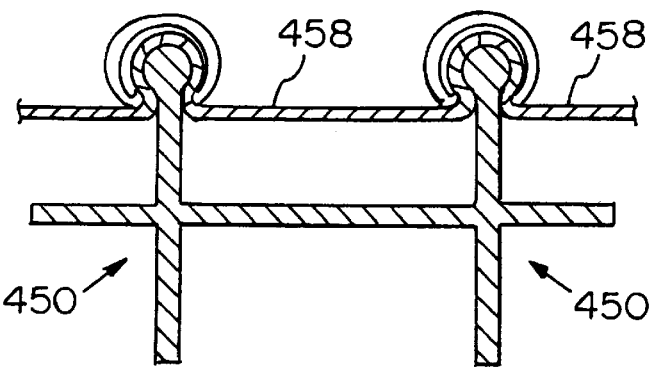
FIG. 16 is a side view of two construction elements supporting a sheet.

FIG. 16 illustrates a sheet-like member 458 supported between two construction elements 450. This arrangement may be extended to a plurality of construction elements supporting a sheet-like member.

Figure 17:
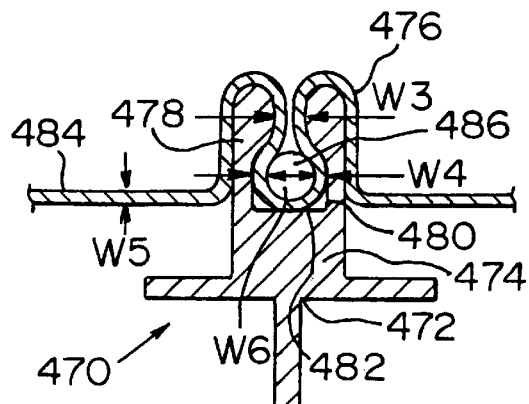
FIG. 17 is a side view of a shaft of one construction element.

FIG. 17 illustrates a construction element 470 having a shaft 472 with a fin 474. The fin 474 has two spaced-apart opposing legs 476, 478 defining a tapered channel 480 therebetween having a minimum gap W3 and having a larger gap W4 toward a base 482 of the channel 480. A pliable sheet-like member 484, such as cloth, having a width W5, may be placed within the channel 480 and a pin 486 having a width W6 greater than the gap width W3 may be secured within the channel 480. The pin 486 may be inserted laterally within the channel 480 or, in the alternative, the legs 476,478 may be resilient and therefore resiliently spread to accept and capture the pin 486 within the channel 480.

Figure 18:
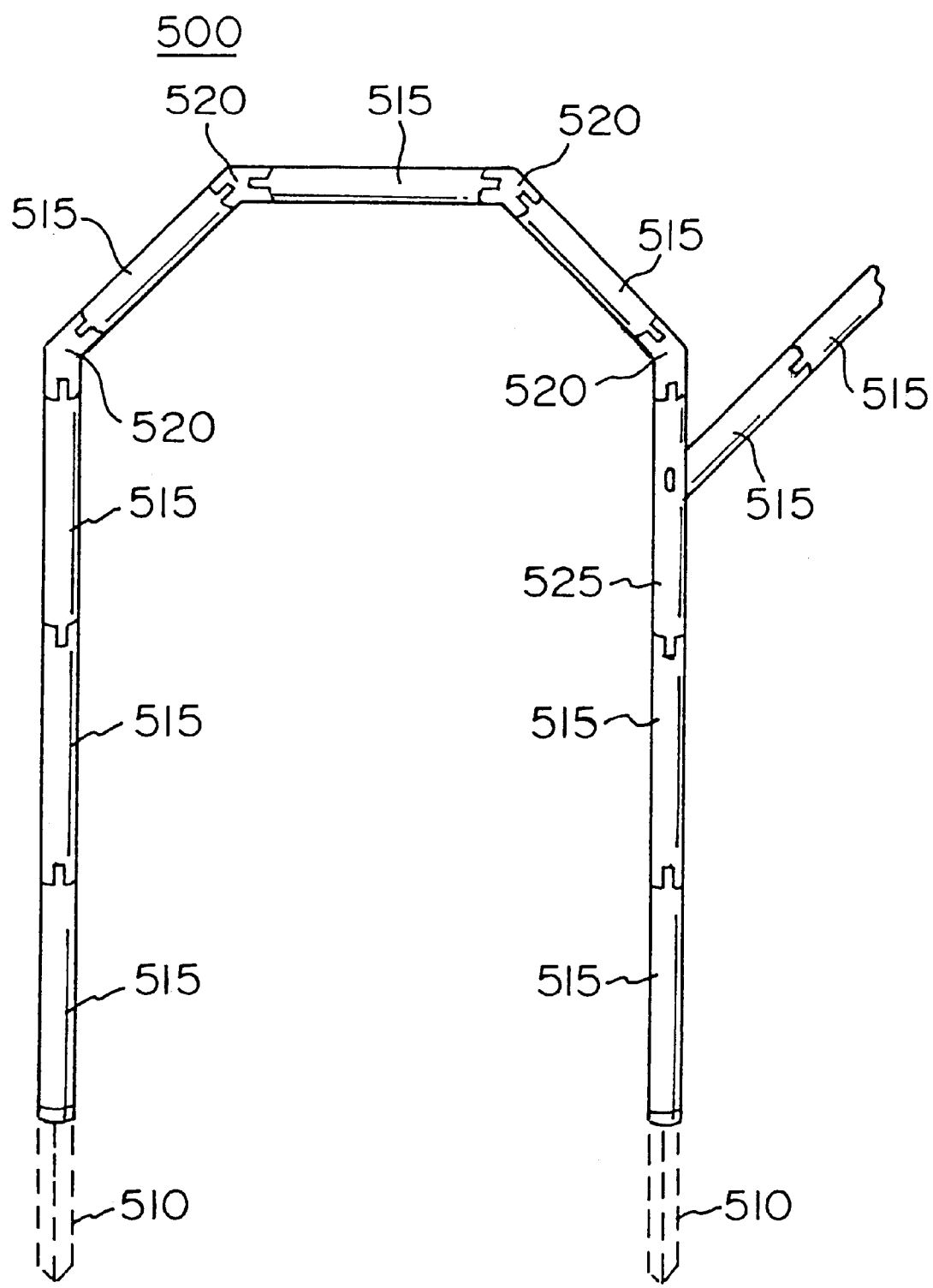
FIG. 18 is a perspective view of a lattice structure constructed using the construction elements of the subject invention.

FIG. 18 illustrates a construction element system 500 forming a lattice comprised of a plurality of interconnected construction elements 510, 515, 520, 525, each possessing features previously discussed. While it is entirely possible to include a coupling device at each end of a shaft, in some instances it may be desirable to form one end of the shaft such that it has a point suitable for soil penetration. In particular, construction element 510 has at one end a coupling device and at another end a point suitable for soil penetration. Construction element 515 is similar to that of construction element 110 shown in FIG. 8, while construction element 520 is similar to construction element 124 shown in FIG. 10. Construction element 525 has a shaft similar to shaft 215 found in FIG. 12 to accept construction element 515 as a cross member, which may extend to another support member. Using a combination of different construction elements, it is possible to construct a lattice structure suitable for, among other things, supporting a tarp or supporting a variety of different hanging plants. The variety of uses for such a structure is limited only by the creativity of the user.

The shaft of a construction element may have any desirable shape that provides sufficient structural rigidity but that, in instances where items are to be secured directly to the shaft, the geometry of the shaft must conform to accommodate those items as shown in the arrangements illustrated in FIGS. 12 and 13.

The invention has been described with reference to the preferred embodiment. Various modifications and alterations will occur upon reading and understanding the preceding detailed description. It is intended that the invention be construed as including all such modifications and alterations insofar as they come within the scope of the appended claims or the equivalents thereof.

I claim:

1. A coupling device comprised of a base with a coupling axis and at least two spaced apart resilient prongs which extend from the base and are parallel to the coupling axis, wherein each prong is comprised of:

a) two radially extending mating surfaces, each having a first and second end;

b) an inner transition surface connecting the first ends of each mating surface;

c) an outer transition surface connecting the second ends of each mating surface;

d) wherein each mating surface is planar and forms an equal but opposite angle with a common baseline connecting the second end of each mating surface; and e) wherein each prong is centered about a radial line and the width of a prong is defined by the length of the radial line associated with each prong from the inner transition surface to the outer transition surface and wherein the width is less than ⅔ the distance from the coupling axis to the outer transition surface.

2. The coupling device according to claim 1 wherein the radial lines associated with each prong are equiangular about the coupling axis.

3. The coupling device according to claim 2 wherein a projection of each mating surface intersects at the coupling axis and forms an angle not greater than 90 degrees.

4. The coupling device according to claim 1 wherein each prong has a top surface with an edge and wherein the edge has a chamfered portion.

5. The coupling device according to claim 1 wherein there are three spaced-apart prongs spaced relative to one another at equal angles about the coupling axis.

6. The coupling device according to claim 1 wherein the outer transition surface is curved.

7. The coupling device according to claim 1 wherein the prongs are sized to provide an interference fit with the prongs of a mating construction element.

8. The coupling device according to claim 7 wherein the prongs are made of a resilient material.

9. The coupling device according to claim 8 wherein the material is polyurethane.

10. A construction element having a core and at least one coupling device integrally thereto, wherein each coupling device is comprised of a base with a coupling axis and at least two spaced apart prongs which extend from the base and are parallel to the coupling axis, wherein each prong is comprised of a) two radially extending mating surfaces, each having a first and second end;

b) an inner transition surface connecting the first ends of each mating surface;

c) an outer transition surface connecting the second ends of each mating surface;

d) wherein each mating surface is planar and forms an equal but opposite angle with a common baseline connecting the second end of each mating surface; and e) wherein each prong is centered about a radial line and the width of a prong is defined by the length of the radial line associated with each prong from the inner transition surface to the outer transition surface and wherein the width is less than ⅔ the distance from the coupling axis to the outer transition surface.

11. The construction element according to claim 10 wherein the core is a shaft and wherein a coupling device is attached to at least one end of the shaft.

12. The construction element according to claim 11 wherein the shaft is straight.

* * * * *